(12) United States Patent
Peana et al.

(10) Patent No.: US 9,720,516 B2
(45) Date of Patent: Aug. 1, 2017

(54) VISCOELASTIC KEYBOARD KEY DESIGN

(71) Applicant: Dell Products L.P., Round Rock, TX (US)

(72) Inventors: Stefan Peana, Austin, TX (US); Mitchell A. Markow, Hutto, TX (US); Warren Langevin, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/286,366

(22) Filed: May 23, 2014

(65) Prior Publication Data
US 2015/0338927 A1    Nov. 26, 2015

(51) Int. Cl.
  *H01H 13/85* (2006.01)
  *G06F 3/02* (2006.01)
  (Continued)

(52) U.S. Cl.
  CPC .......... *G06F 3/0202* (2013.01); *G06F 1/1662* (2013.01); *H01H 13/704* (2013.01); *H01H 13/82* (2013.01); *H01H 13/85* (2013.01); *H01H 2215/00* (2013.01); *H01H 2221/044* (2013.01); *H01H 2221/062* (2013.01); *H01H 2221/084* (2013.01); *Y10T 29/49107* (2015.01); *Y10T 74/20468* (2015.01)

(58) Field of Classification Search
  CPC .. H01H 2215/00; H01H 2215/04; H01H 3/12; H01H 13/26; H01H 13/82; H01H 13/703; H01H 13/84; H01H 13/85; H01H 2221/084
  See application file for complete search history.

(56) References Cited

U.S. PATENT DOCUMENTS

| | | | | |
|---|---|---|---|---|
| 4,467,321 A | * | 8/1984 | Volnak | G06F 3/016 200/5 A |
| 5,089,671 A | * | 2/1992 | Ranetkins | H01H 13/702 200/302.2 |
| 2009/0033521 A1 | * | 2/2009 | Ladouceur | H01H 13/705 341/22 |

FOREIGN PATENT DOCUMENTS

| | | | |
|---|---|---|---|
| JP | 60-011376 A | * | 1/1985 |
| JP | 10-247438 A | * | 9/1998 |
| JP | 2003157742 A | * | 5/2003 |

OTHER PUBLICATIONS

"Key Matrix Using a Fluid Medium;" Aug. 1970; IBM Technical Disclosure Bulletin; vol. 13, issue 3, p. 744.*

(Continued)

*Primary Examiner* — Daniel J Colilla
(74) *Attorney, Agent, or Firm* — Terrile, Cannatti, Chambers & Holland, LLP; Stephen A. Terrile

(57) ABSTRACT

A system and method which provide a keyboard with keys which are configured using a viscoelasticity model. More specifically, with the viscoelasticity model at least certain keys within the keyboard include an elastic component and a viscous component. The elastic component provides a component force which occurs substantially immediately upon application of a stress to the key and relaxes substantially immediately upon release of the stress from the key. In this way the elastic component functions similarly to a spring in a mechanical dashpot model key. The viscous component provides a component force which grows with time as long as a stress is applied to the key. In this way, the viscous component functions similarly to a dash in a mechanical dashpot model key.

12 Claims, 4 Drawing Sheets

(51) Int. Cl.
*G06F 1/16* (2006.01)
*H01H 13/82* (2006.01)
*H01H 13/704* (2006.01)

(56) References Cited

OTHER PUBLICATIONS

What's Alpha GEL, Taica Corporation , Aug. 27, 2015; product description; http://www.taica.co.jp/gel-english/alpha/.*

* cited by examiner

VISCOELASTIC KEYBOARD KEY DESIGN

BACKGROUND OF THE INVENTION

Field of the Invention

The present invention relates to information handling systems. More specifically, embodiments of the invention relate to a viscoelastic keyboard key design for use with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use keyboards as an input/output (I/O) device for information handling systems. Many keyboard designs comprise a plurality of independently actuatable keys. There are a plurality of issues associated with known information handling system keyboard and key designs. For example, some key designs are designed and manufactured with different mechanical structures to collapse and deform to the point of buckling in response to user feedback. These mechanical structures present a number of challenges that can limit the form factors of certain keyboard designs while providing desired user feedback and experience.

It is desirable to optimize a number of variables associated with key designs. These variables include Z-Height, Noise and Surface Rigidity. More specifically, with respect to Z-Height, a mechanical key often has a minimum height requirement that could limit design of thin form factors for tablets, convertibles, and notebooks with discrete keyboards. With respect to noise, a mechanical key can produce a noise at the time when the structure collapses and contacts the system base. This noise can vary depending on the force and repetition of key strokes and may not be desirable for the user experience. With respect to surface rigidity, some mechanical key designs can have a rigid molded surface so that with user interaction to repeatedly collapse the keys can lead to finger fatigue over the course of a session.

Accordingly, it is desirable to provide keyboard and key design improvements with thin, light, and soft keys that provide responsive feedback and enable new form factors for end users.

SUMMARY OF THE INVENTION

A system and method are disclosed which provide a keyboard with keys which are configured using a viscoelasticity model. More specifically, with the viscoelasticity model at least certain keys within the keyboard include an elastic component and a viscous component. The elastic component provides a component force which occurs substantially immediately upon application of a stress to the key and relaxes substantially immediately upon release of the stress from the key. In this way the elastic component functions similarly to a spring in a mechanical dashpot model key. The viscous component provides a component force which grows with time as long as a stress is applied to the key. In this way, the viscous component functions similarly to a dash in a mechanical dashpot model key.

In certain embodiments, the keys are configured such that a key cavity is filled with an elastic viscous material and covered with a structurally deformable material. Stress applied upon a top rigid layer (which functions as the elastic component) is transferred onto the viscous material as an induced strain. Because the viscous material is elastic but not deformable, a displacement outlet is provided so that the viscous material is displaced with the applied strain rate. In certain embodiments, the time and rate of deformation of the rigid material structure layer (the elastic component) is tuned such that the layer buckles at a pre-defined stress level to indicate an end of stress applied cycle.

In other embodiments, the key cavity is filled with a viscous material which is deformable such that material displacement is not necessary. With this type of viscous material, substantially hollow deformable particles are mixed into the viscous material then the composition is stressed loaded to the point of deformation. This point of deformation is referred to as creep. In certain embodiments, the hollow deformable particles are designed to collapse once the key reaches the point of deformation (i.e., the creep point). In other embodiments, the hollow deformable particles are designed to deform gradually such as by using different particle sizes and/or particles with different deformation characteristics (i.e., with different deformation creep points).

In certain embodiments, various materials are used to provide the viscous material. For example, in certain embodiments, a rigid polymer layer made of polycarbonate (PC) or polymethyl methacrylate (PMMA) with different thickness and flat surfaces or notched surface to promote buckling. In certain embodiments, the viscoelastic material comprises at least one of an ALPHA GEL® silicone gel material, a high-damping urethane, or natural rubber. More specifically in certain embodiments, the viscous material comprises an ALPHA GEL®, transparent with Young's Modulus of 28.9 kPa and 340% elongation made by Taica Corporation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
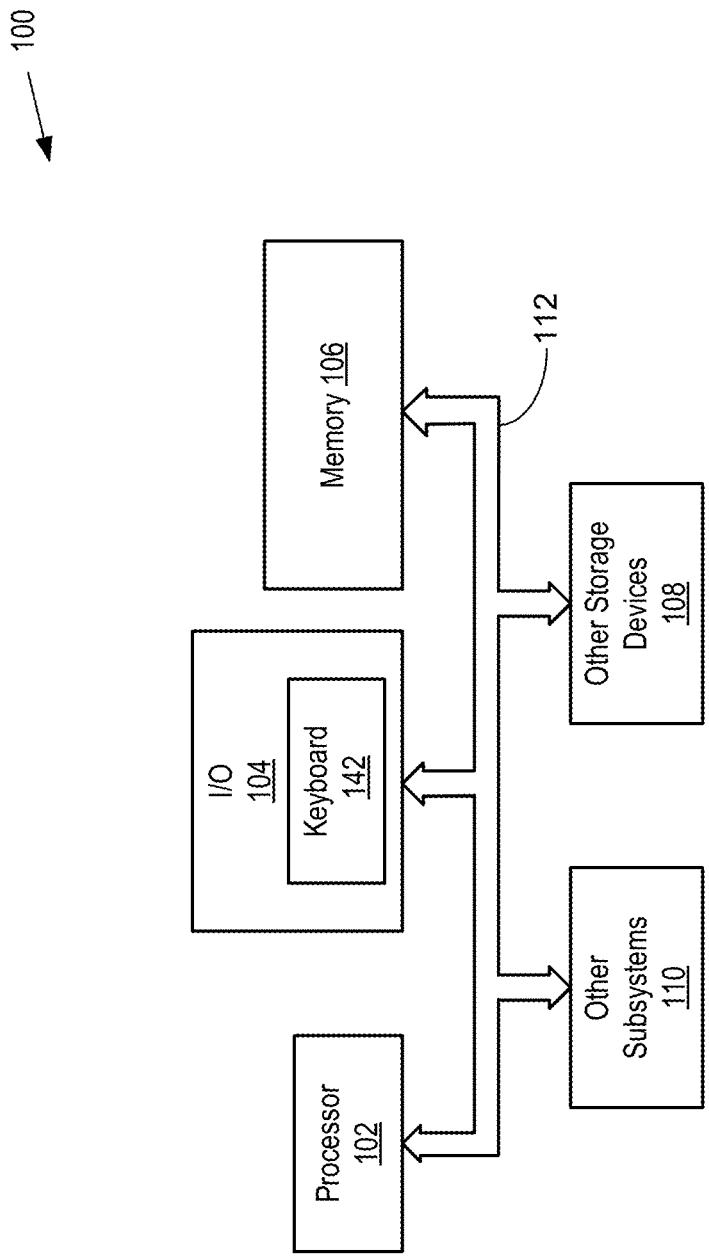
FIG. 1 shows s a general illustration of components of an information handling system as implemented in the system and method of the present invention.

Referring to FIG. 1, a generalized illustration of an information handling system 100 that can be used to implement the system and method of the present invention is shown. The information handling system 100 includes a processor (e.g., central processor unit or "CPU") 102, input/output (I/O) devices 104, such as a display, a keyboard, a mouse, and associated controllers, memory 106, various other subsystems 108 and other storage devices 110, some or all of which are coupled via a one or more buses 112. The information handling system 100 further includes a keyboard 142 which includes keys which are configured using a viscoelasticity model.

More specifically, with the viscoelasticity model at least certain keys within the keyboard 112 include an elastic component and a viscous component. The elastic component provides a component force which occurs substantially immediately upon application of a stress to the key and relaxes substantially immediately upon release of the stress from the key. In this way, the elastic component functions similarly to a spring in a mechanical dashpot model key. The viscous component provides a component force which grows with time as long as a stress is applied to the key. In this way, the viscous component functions similarly to a dash in a mechanical dashpot model key.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
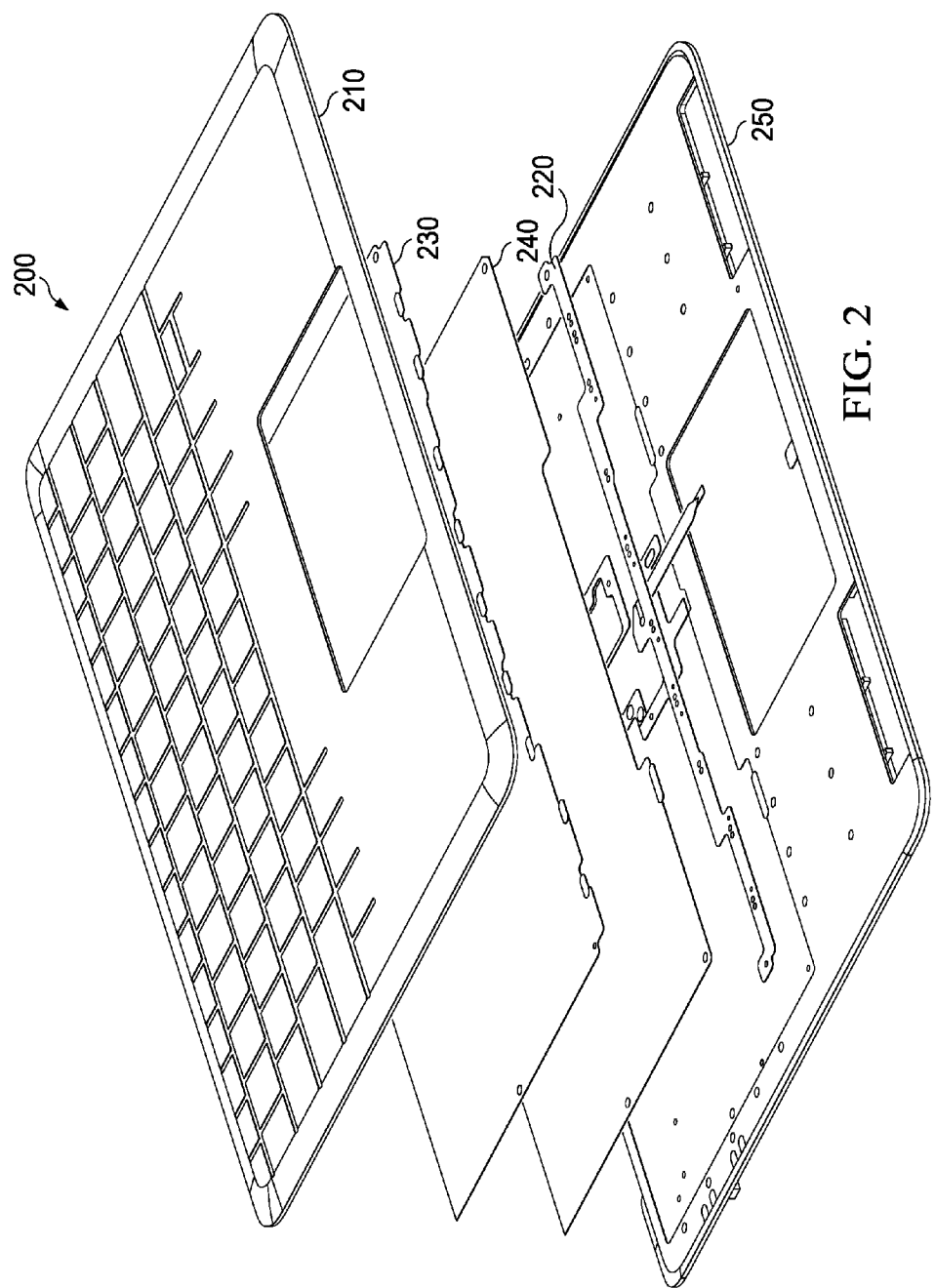
FIG. 2 shows a perspective exploded view of a keyboard system.

FIG. 2 shows a perspective exploded view of an example keyboard system 200 in which some or all of the keys are configured using a viscoelasticity model. More specifically, the keyboard system 200 includes a keymat 210 (also referred to as a keypad), such as a silicone keymat, a light emitting diode (LED) flex portion 220 for providing back lighting to the keymat, a light guide 230, such as a light guide sheet, for dispersing the light generated by the LED flex portion 220, a force sensing portion 240, such as a force sensing membrane, and a keyboard system support 250, such as a metal support plate. Providing keys within the keymat 210 which conform to a viscoelasticity model uniquely opents alternative force sensing opportunities. For example, the force sensing portion 240 may comprise a pressure sensing mechanism, a force sensing mechanism, a capacitive sensing mechanism, etc.

Figure 3:
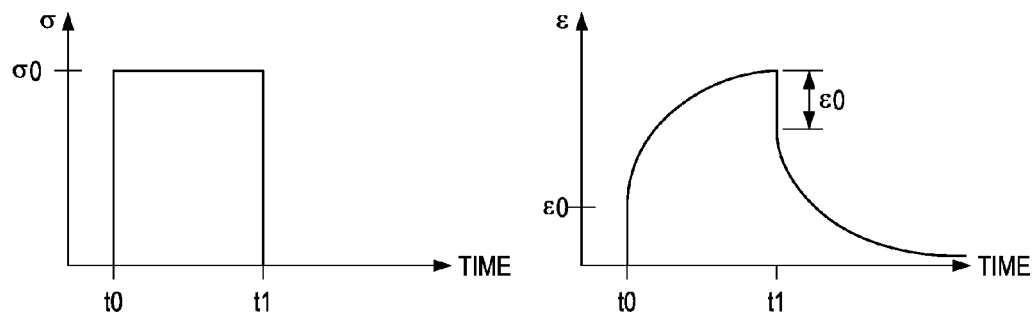
FIG. 3 shows example graphs of applied stress and induced strain response of a key configured according to the present invention.

Referring to FIG. 3, example graphs of applied stress and induced strain response of a key configured according to the present invention is shown. More specifically, as a constant stress ($\sigma 0$) is applied across a time from time t0 to time t1, a strain ($\epsilon$) is produced where the initial strain at time t0 and the ending strain ($\epsilon$) at time T1 each substantially correspond to strain ($\epsilon 0$). Additionally, the strain gradually increases between time t0 and time t1 and then gradually decays subsequent to time t1.

Figure 4:
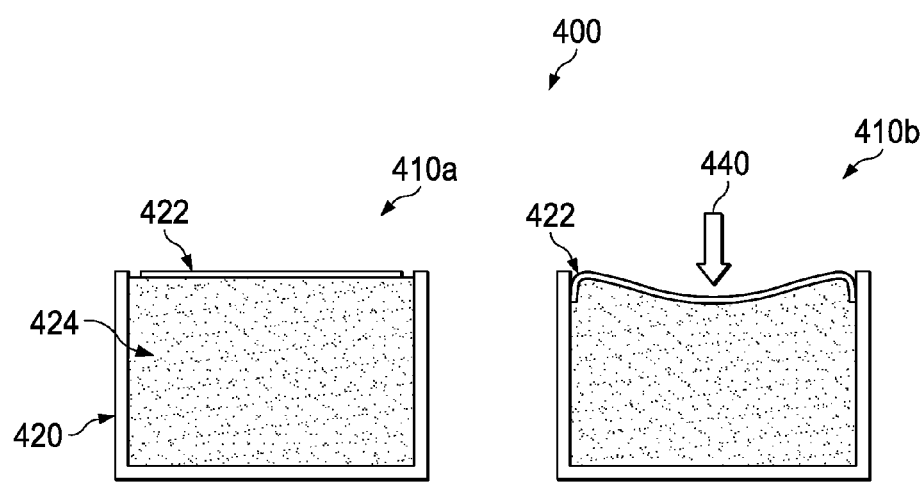
FIG. 4 shows cross sections of a key design 400 in accordance with embodiments of the present invention.

Referring to FIG. 4, cross sections of a key design 400 in accordance with embodiments of the present invention is shown. More specifically, a cross section 410a shows the key when not under a stress load (i.e., when the key is not actuated) and a key cross section 410b shows the key when under a stress load. Each key includes an outer key shell 420, a top key layer 422 and an elastic viscous portion 424. When the key 400 receives a pressing force 440 (such as when a user actuates the key), the top key layer 422 indents causing the elastic viscous portion 424 to be displaced.

Figure 5:
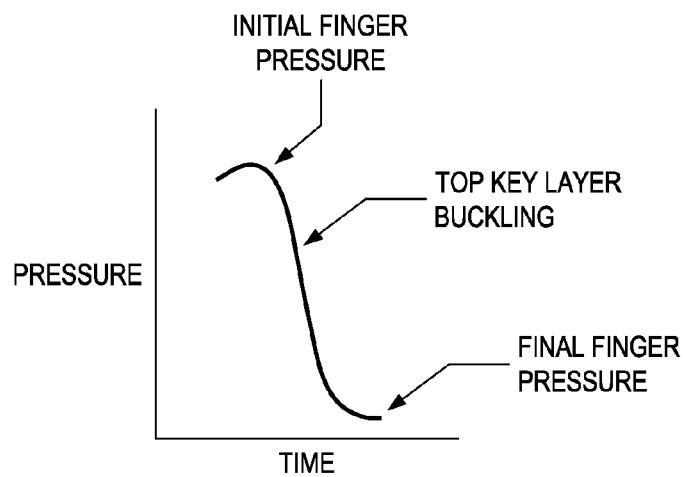
FIG. 5 shows an example graph of the stress decay of a key according to the present invention.

Referring to FIG. 5, an example graph of the stress decay of a key according to the present invention is shown. More specifically, the stress for displacing the elastic viscous material 424 decays exponentially with time as the viscous material is displaced at a rate dependent of the applied stress strain relationship.

Figure 6:
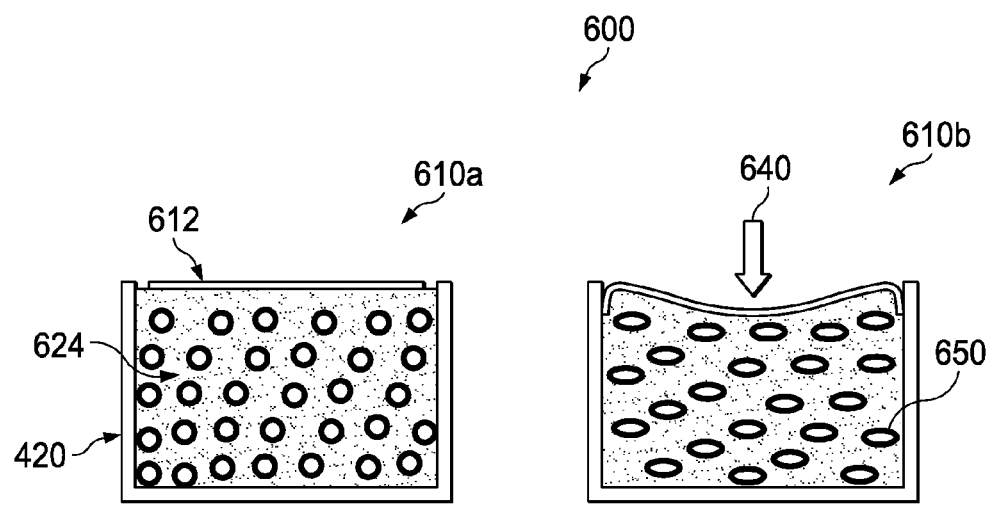
FIG. 6 shows cross sections of a key design in accordance with embodiments of the present invention.

Referring to FIG. 6, cross sections of a key design 600 in accordance with embodiments of the present invention is shown. More specifically, a cross section 610a shows the key when not under a stress load (i.e., when the key is not actuated) and a key cross section 610b shows the key when under a stress load. In certain embodiments, the keys are configured such that a key cavity is filled with an elastic viscous material 624 and covered with a top key layer 612 constructed of structurally deformable material which is substantially rigid. Stress 640 applied upon a top key layer (which functions as the elastic component) is transferred onto the viscous material as an induced strain. Because the viscous material is elastic but not compressible, a displacement outlet is provided so that the viscous material is displaced with the applied strain rate. In certain embodiments, the time and rate of deformation of the top key layer 612 is tuned such that the layer buckles at a pre-defined stress level to indicate an end of a stress applied cycle.

In certain embodiments, the key cavity is filled with a viscous material which is deformable such that material displacement is not necessary. With this type of viscous material, substantially hollow deformable particles are mixed into the viscose material then the composition is stressed loaded to the point of deformation. This point of deformation is referred to as creep. In certain embodiments, the hollow deformable particles are designed to collapse once the key reaches the point of deformation (i.e., the creep point). In other embodiments, the hollow deformable particles are designed to deform gradually such as by using different particle sizes and/or particles with different deformation characteristics (i.e., with different deformation creep points).

It will be appreciated that a plurality of viscous materials can be used for the key cavity. For example, in certain embodiments, a rigid polymer layer made of polycarbonate (PC) or polymethyl methacrylate (PMMA) with different thickness and flat surfaces or notched surface to promote buckling. In certain embodiments, the viscoelastic material comprises an Alpha gel, a high-damping urethane, natural rubber, etc., materials typically used for shoe cushioning, vibration dampening, shock absorption, etc. More specifically in certain embodiments, the viscous material comprises an ALPHA GEL® silicone gel material, transparent with Young's Modulus of 28.9 kPa and 340% elongation made by Taica Corporation. Additionally, in certain embodiments the viscous material comprises either spherical or cylindrical deformable particles 650, the choice of which can be made to provide a specific collapse load.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system."

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A method for improving key response comprising:
providing a keyboard with a plurality of individually actuatable keys;
configuring at least some of the individually actuatable keys using a viscoelasticity model; and
providing the at least some of the individually actuatable keys with an elastic component and a viscous component, the elastic component providing an elastic component force, the elastic component force occurring substantially immediately upon application of a stress load to a respective key and relaxing substantially immediately upon release of the stress load from the respective key, the stress load being applied by a pressing force from a user actuating the respective key, the viscous component providing a viscous component force, the viscous component force growing with time to a maximum viscous component force, the viscous component force being applied as long as a stress is applied to the respective key; and wherein,
the stress load necessary to displace the viscous component decays exponentially with time as the elastic component is displaced at a rate dependent of an applied stress strain relationship.

2. The method of claim 1, wherein:
the elastic component comprises a top rigid layer;
the viscous component is not compressible; and,
stress applied upon the top rigid layer is transferred onto the viscous component as an induced strain.

3. The method of claim 2, wherein:
the top rigid layer comprises a rigid material; and,
the time and rate of deformation of the rigid material is tuned such that the top rigid layer buckles at a predefined stress level to indicate an end of stress applied cycle.

4. The method of claim 1, wherein
the viscous component comprises at least one of a silicone gel material, a high-damping urethane, or natural rubber.

5. An information handling system comprising:
a processor;
a data bus coupled to the processor; and
a keyboard, the keyboard comprising a plurality of individually actuatable keys, at least some of the individually actuatable keys being configured using a viscoelasticity model; and wherein
the at least some of the individually actuatable keys comprise an elastic component and a viscous component, the elastic component providing an elastic component force, the elastic component force occurring substantially immediately upon application of a stress load to a respective key and relaxing substantially immediately upon release of the stress load from the respective key, the stress load being applied by a pressing force from a user actuating the respective key, the viscous component providing a viscous component force, the viscous component force growing with time to a maximum viscous component force, the viscous component force being applied as long as a stress is applied to the respective key; and,
the stress load necessary to displace the viscous component decays exponentially with time as the elastic component is displaced at a rate dependent of an applied stress strain relationship.

6. The information handling system of claim 5, wherein:
the elastic component comprises a top rigid layer;
the viscous component is not compressible; and,
stress applied upon the top rigid layer is transferred onto the viscous component as an induced strain.

7. The information handling system of claim 6, wherein:
the top rigid layer comprises a rigid material; and,
the time and rate of deformation of the rigid material is tuned such that the top rigid layer buckles at a predefined stress level to indicate an end of stress applied cycle.

8. The information handling system of claim 5, wherein
the viscous component comprises at least one of a silicone gel material, a high-damping urethane, or natural rubber.

9. A keyboard system comprising:
a force sensing portion;
a plurality of individually actuatable keys, at least some of the individually actuatable keys being configured using a viscoelasticity model, each of the plurality of individually actuatable keys providing a respective force to the force sensing portion; and wherein
the at least some of the individually actuatable keys comprise an elastic component and a viscous component, the elastic component providing an elastic component force, the elastic component force occurring substantially immediately upon application of a stress load to a respective key and relaxing substantially immediately upon release of the stress load from the respective key, the stress load being applied by a pressing force from a user actuating the respective key, the viscous component providing a viscous component force, the viscous component force growing with time to a maximum viscous component force, the viscous component force being applied as long as a stress is applied to the respective key; and,
the stress load necessary to displace the viscous component decays exponentially with time as the elastic component is displaced at a rate dependent of an applied stress strain relationship.

10. The keyboard system of claim 9, wherein:
the elastic component comprises a top rigid layer;
the viscous component is not compressible; and,
stress applied upon the top rigid layer is transferred onto the viscous component as an induced strain.

11. The keyboard system of claim 10, wherein:
the top rigid layer comprises a rigid material; and,
the time and rate of deformation of the rigid material is tuned such that the top rigid layer buckles at a predefined stress level to indicate an end of stress applied cycle.

12. The keyboard system of claim 9, wherein
the viscous component comprises at least one of a silicone gel material, a high-damping urethane, or natural rubber.

* * * * *